June 14, 1938.   F. P. BROUSSARD   2,120,543
APPARATUS FOR MIXING MATERIALS
Filed May 19, 1937   2 Sheets-Sheet 1
FIG. 1.
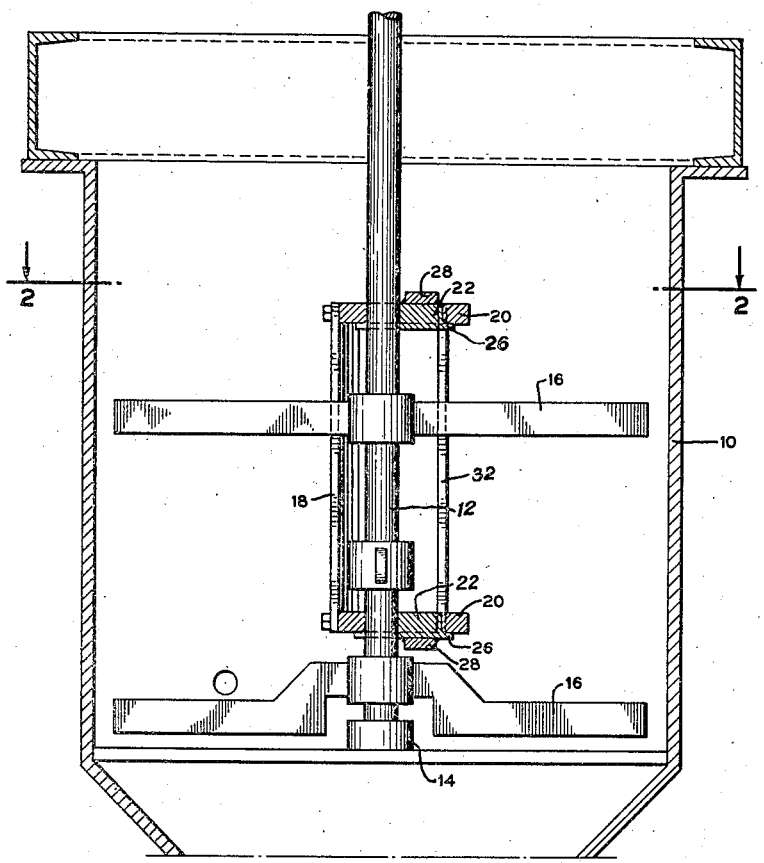
FIG. 3.
FIG. 4.
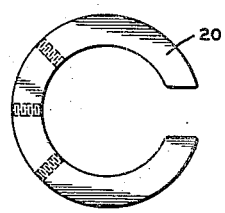
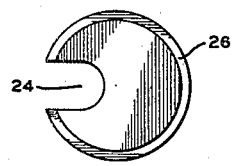
FIG. 3a.
FIG. 4a.
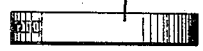
FRANK P. BROUSSARD
INVENTOR
BY R. J. Dearborn
ATTORNEY June 14, 1938.   F. P. BROUSSARD   2,120,543
APPARATUS FOR MIXING MATERIALS
Filed May 19, 1937   2 Sheets-Sheet 2
FIG. 2.
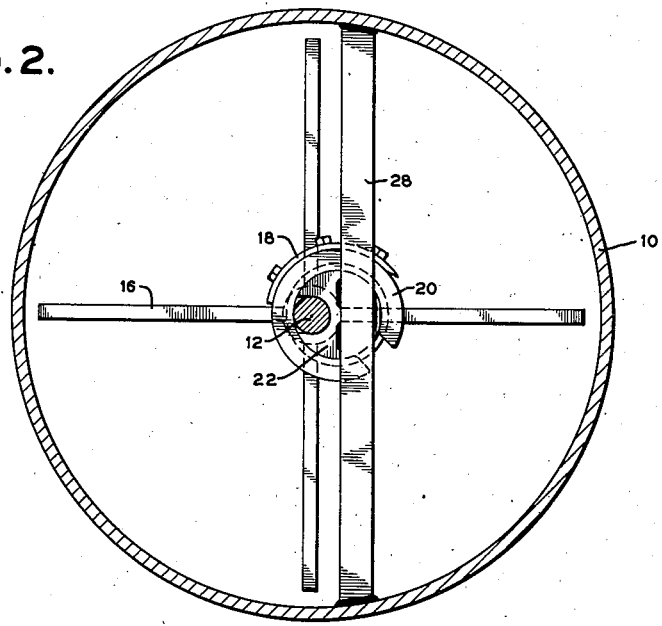
FIG. 5.
FIG. 5a.
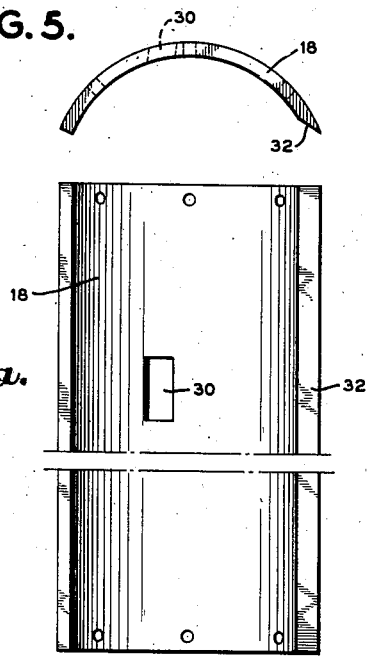
FRANK P. BROUSSARD
INVENTOR
BY R. J. Dearborn
ATTORNEY Patented June 14, 1938

2,120,543

UNITED STATES PATENT OFFICE 2,120,543

APPARATUS FOR MIXING MATERIALS

Frank P. Broussard, Port Arthur, Tex., assignor to The Texas Company, New York, N. Y., a corporation of Delaware Application May 19, 1937, Serial No. 143,426

6 Claims. (Cl. 259—107)

This invention relates to apparatus for stirring and mixing materials and more particularly to apparatus for intimately mixing viscous or semisolid materials such, for example, as greases of the type employed as lubricants.

In most of the stirring devices now in more or less general use that portion of the material to be mixed which is nearest to the side of the kettle containing the material travels in a longer path and receives more stirring than that portion which is nearer the center of the kettle. It is therefore an object of the present invention to provide an apparatus for stirring or mixing viscous or semi-solid material such, for example, as lubricating grease in such a manner that all of the material to be mixed receives substantially the same amount of stirring. Briefly stated, this object of the invention is accomplished by incorporating in the stirring apparatus means for continuously moving the material radially from the center of the stirring kettle towards the wall of the mixing kettle.

This and other objects, features and advantages of the invention will more readily appear from the following description, when taken in connection with the accompanying drawings, in which:

Fig. 1 is a view in vertical section of a mixing apparatus embodying the present invention, Fig. 2 is a sectional plan view taken on line 2—2 of Fig. 1, Fig. 3 is an enlarged plan view of one of a pair of similar ring members which form a part of the apparatus shown in Figs. 1 and 2, Fig. 3a is an enlarged elevational view of the ring member shown in Fig. 3.

Fig. 4 is an enlarged plan view of one of a pair of fixed bearing members which form a part of the apparatus, and Fig. 4a is an enlarged elevational view of the bearing member shown in Fig. 4.

Fig. 5 is an enlarged plan view of a radial propeller which is mounted on the rings, one of which is shown in Fig. 3.

Fig. 5a is an enlarged elevational view of the radial propeller shown in Fig. 5.

The apparatus herein to be described, although adapted for a wide variety of uses, is particularly adapted for use in connection with the mixing or blending of petroleum greases, and accordingly the following description will, for illustrative purposes, refer to the mixing of greases in the improved apparatus.

In the drawings there is shown a chambered member 10, of somewhat conventional design and known in the petroleum industry as a grease kettle. A vertically disposed rotatable shaft 12 extends into the kettle 10 and at its lower end is mounted in a fixed bearing member 14. Radially extending paddles or blades 16, 16 are mounted on the shaft 12 and are adapted to agitate or mix the contents of the kettle when the shaft 12 is rotated. The particular means employed for rotating the shaft 12 forms no part of the present invention and therefore will not be described. Suffice to say that any suitable means may be employed, either power actuated means for larger types of installations or manually operated means for smaller types of installations.

One of the disadvantages of mixing devices of this general type, as commonly employed, is that the grease at or near the outer wall of the kettle travels in a longer path and receives more stirring than the portion which is nearer the center of the kettle. To overcome this disadvantage in the present apparatus an additional stirring member 18 is provided and so positioned with respect to the shaft 12 that as the shaft 12 rotates grease is caused to move in radial directions towards the outer wall of the kettle. The stirring member 18 is in the form of an arcuate plate or blade and is positioned parallel to, but spaced from, the shaft 12 and is secured at each of its ends to a ring-like member 20 which encircles the shaft 12 but is not concentric therewith. Each of the ring-like members 20 is supported upon a stationary bearing member 22 which is formed with a recessed portion 24 (Fig. 4) adapted to accommodate the shaft 12, and with a cut-out portion around its lower edge forming a substantially annular flange 26 upon which one of the ring-like members 20 rests and can rotate, the arrangement being such that each ring-like member 20 rests upon the flange 26 and encircles the body portion of one of the bearing members 22. The bearing members are each secured in fixed position by being welded or otherwise attached to one of a pair of horizontally disposed bars 28 which in turn are rigidly secured at their ends to the wall of the kettle as, for example, by welding.

From the foregoing it will be seen that the blade 18 is so mounted that it may be rotated freely about an axis which corresponds to the center of the superposed ring-like members 20, the axis being eccentric with respect to the axis of the shaft 12. Thus as the blade 18 is turned about its own axis its position with respect to the axis of the shaft 12 is constantly being changed and grease in the path of the blade 18 will be forced outwardly or radially towards the wall of the kettle 10.

The blade 18 is formed with a slot 30 (Fig. 5) through which one of the paddles 16 extends. Thus any rotary movement of the shaft imparts a corresponding movement to the blade 18. The forward edge of the blade 18 may, if desired, be bevelled to provide a cutting edge, as shown at 32 in Fig. 5, in order to facilitate the passage of the blade through the body of grease in the kettle.

From the foregoing description it will be seen that grease or other materials contained in the kettle 10 will be agitated or stirred not only by the paddles 16 but also by the blade 18 which, as already stated, moves the grease or other material radially from the center towards the outer wall of the kettle. In this manner a uniform mixing of the contents of the kettle is obtained as there is less tendency for some of the material to remain at the center of the mass.

Obviously, many modifications and variations may be made in the invention herein set forth without departing from the spirit and scope thereof, and therefore only such limitations should be imposed as are indicated in the appended claims.

I claim:

1. Apparatus for mixing materials comprising a chambered member, a vertically disposed shaft extending into said chambered member and adapted to be rotated therein, an arcuate plate having one of its longitudinal edges bevelled to provide a cutting edge disposed within said chambered member parallel to said shaft on an axis which is eccentric with respect to the axis of said shaft, and means connecting said shaft and said plate for imparting to said plate any rotary movement of said shaft.

2. Apparatus for mixing materials comprising a chambered member, a vertically disposed shaft extending into said chambered member and adapted to be rotated therein, an arcuate plate having an opening therein and one of its longitudinal edges bevelled to provide a cutting edge disposed within said chambered member parallel to said shaft on an axis which is eccentric with respect to the axis of the shaft, and a mixing paddle mounted on said shaft and having one end extending through the opening in said plate for rotating said plate in accordance with the rotation of said shaft.

3. Apparatus for mixing materials comprising a chambered member, a vertically disposed shaft extending into said chambered member and adapted to be rotated therein, a pair of spaced and superposed bearing members mounted within said chambered member with their common axis eccentric with respect to the axis of said shaft and each of said bearing members being formed with a recessed portion adapted to accommodate said shaft and a cut-out portion around its lower edge forming a substantially annular flange, a ring-like member surrounding each of said bearing members and rotatable upon the flange thereof, an arcuate stirring plate secured at its opposite ends to said ring-like members, and means connecting said shaft and said plate so that rotation of the shaft will cause rotation of said plate.

4. Apparatus for mixing materials comprising a chambered member, a vertically disposed shaft extending into said chambered member and adapted to be rotated therein, a pair of spaced and superposed bearing members mounted within said chambered member with their common axis eccentric with respect to the axis of said shaft and each of said bearing members being formed with a recessed portion adapted to accommodate said shaft and a cut-out portion around its lower edge forming a substantially annular flange, a ring-like member surrounding each of said bearing members and rotatable upon the flange thereof, an arcuate stirring plate secured between said ring-like members, and a plurality of paddles mounted on said shaft, one of said paddles engaging said plate so that rotation of the shaft will cause rotation of said plate.

5. Apparatus for mixing materials comprising a chambered member, a vertically disposed shaft extending into said chambered member and adapted to be rotated therein, a plurality of horizontally disposed and superposed bars secured at their ends to the wall of the chambered member, a bearing member mounted on each of said bars with their common axis eccentric with respect to the axis of said shaft and each of said bearing members being formed with a recessed portion adapted to accommodate said shaft, a ring-like member supported by each of said bearing members and encircling said shaft, an arcuate stirring plate secured to said ring-like members, and means connecting said shaft and said plate so that rotation of the shaft will cause rotation of said plate.

6. In apparatus for mixing materials, a chambered member adapted to contain the material to be mixed, a vertically disposed shaft extending into said chambered member and adapted to be rotated therein, a vertically disposed and freely rotatable arcuate plate having one of its edges bevelled to provide a cutting edge mounted in said chambered member parallel to but on an axis different from that of the shaft, and a horizontally disposed paddle mounted on said shaft and having its outer end in contact with said plate so that rotation of the shaft will cause rotation of said plate.

FRANK P. BROUSSARD.